United States Patent
Goldberg et al.

(12) 
(10) Patent No.: US 6,711,570 B1
(45) Date of Patent: Mar. 23, 2004

(54) SYSTEM AND METHOD FOR MATCHING TERMS CONTAINED IN AN ELECTRONIC DOCUMENT WITH A SET OF USER PROFILES

(75) Inventors: Jonathan Michael Goldberg, San Francisco, CA (US); Hernan Epelman-Wang, Redwood City, CA (US)

(73) Assignee: Tacit Knowledge Systems, Inc., Palo Alto, CA (US)

( * ) Notice: Subject to any disclaimer, the term of this patent is extended or adjusted under 35 U.S.C. 154(b) by 170 days.

(21) Appl. No.: 09/703,328

(22) Filed: Oct. 31, 2000

(51) Int. Cl.[7] ............................. G06F 17/30; G09G 5/00
(52) U.S. Cl. ............................... 707/6; 345/745
(58) Field of Search ..................... 707/1–5, 6, 500; 705/10; 345/745; 715/500

(56) References Cited

U.S. PATENT DOCUMENTS

| | | | |
|---|---|---|---|
| 5,924,090 A | | 7/1999 | Krellenstein |
| 6,009,410 A | * | 12/1999 | LeMole et al. ................ 705/1 |

* cited by examiner

*Primary Examiner*—Alford Kindred
(74) *Attorney, Agent, or Firm*—Blakely, Sokoloff, Taylor & Zafman LLP (57) ABSTRACT

A plurality of mappings of each keyword of a plurality of keywords contained in a set of terms to one or more related keywords of a plurality of related keywords in the set of terms is created. One or more mappings from the plurality of mappings is selected based on a set of parameters. Finally, the selected mappings are processed to obtain one or more search expressions.

45 Claims, 7 Drawing Sheets

SYSTEM AND METHOD FOR MATCHING TERMS CONTAINED IN AN ELECTRONIC DOCUMENT WITH A SET OF USER PROFILES

FIELD OF THE INVENTION

This invention relates generally to the field of knowledge management and more particularly to a system and method for matching terms contained in an electronic document with a set of user profiles.

COPYRIGHT NOTICE/PERMISSION

A portion of the disclosure of this patent document contains material, which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1999, Tacit Knowledge Systems, Inc., All Rights Reserved.

BACKGROUND OF THE INVENTION

The new field of "knowledge management" (KM) is receiving increasing recognition as the gains to be realized from the systematic effort to store and export vast knowledge resources held by employees of an organization are being recognized. The sharing of knowledge broadly within an organization offers numerous potential benefits to an organization through the awareness and reuse of existing knowledge, and the avoidance of duplicate efforts.

In order to maximize the exploitation of knowledge resources within an organization, a knowledge management system may be presented with two primary challenges, namely (1) the identification of knowledge resources within the organization and (2) the distribution and accessing of information regarding such knowledge resources within the organization.

The identification, capture, organization and storage of knowledge resources is a particularly taxing problem. Prior art knowledge management systems have typically implemented knowledge repositories that require users manually to input information frequently into pre-defined fields, and in this way manually and in a prompted manner to reveal their personal knowledge base. However, this approach suffers from a number of drawbacks in that the manual entering of such information is time consuming and often incomplete, and therefore places a burden on users who then experience the inconvenience and cost of a corporate knowledge management initiative long before any direct benefit is experienced. Furthermore, users may not be motivated to describe their own knowledge and to contribute documents on an ongoing basis that would subsequently be re-used by others without their awareness or consent. The manual input of such information places a burden on users who then experience the inconvenience and cost of a corporate knowledge management initiative long before any direct benefit is experienced.

It has been the experience of many corporations that knowledge management systems, after some initial success, may fail because either compliance (i.e., the thoroughness and continuity with which each user contributes knowledge) or participation (i.e., the percentage of users actively contributing to the knowledge management system) falls to inadequate levels. Without high compliance and participation, it becomes a practical impossibility to maintain a sufficiently current and complete inventory of the knowledge of all users. Under these circumstances, the knowledge management effort may never offer an attractive relationship of benefits to costs for the organization as a whole, reach a critical mass, and the original benefit of knowledge management falls apart or is marginalized to a small group.

In order to address the problems associated with the manual input of knowledge information, more sophisticated prior art knowledge management initiatives may presume the existence of a centralized staff to work with users to capture knowledge bases. This may however increase the ongoing cost of knowledge management and requires a larger up-front investment before any visible payoff, thus deterring the initial funding of many an otherwise promising knowledge management initiatives. Even if an initial decision is made to proceed with such a sophisticated knowledge management initiative, the cash expenses associated with a large centralized knowledge capture staff may be liable to come under attack, given the difficulty of quantifying knowledge management benefits in dollar terms.

As alluded to above, even once a satisfactory knowledge management information base has been established, the practical utilization thereof to achieve maximum potential benefit may be challenging. Specifically, ensuring that the captured information is readily organized, available, and accessible as appropriate throughout the organization may be problematic.

SUMMARY OF THE INVENTION

A plurality of mappings of each keyword of a plurality of keywords contained in a set of terms to one or more related keywords of a plurality of related keywords in the set of terms is created. One or more mappings from the plurality of mappings are selected based on a set of parameters. Finally, the selected mappings are processed to obtain one or more search expressions.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
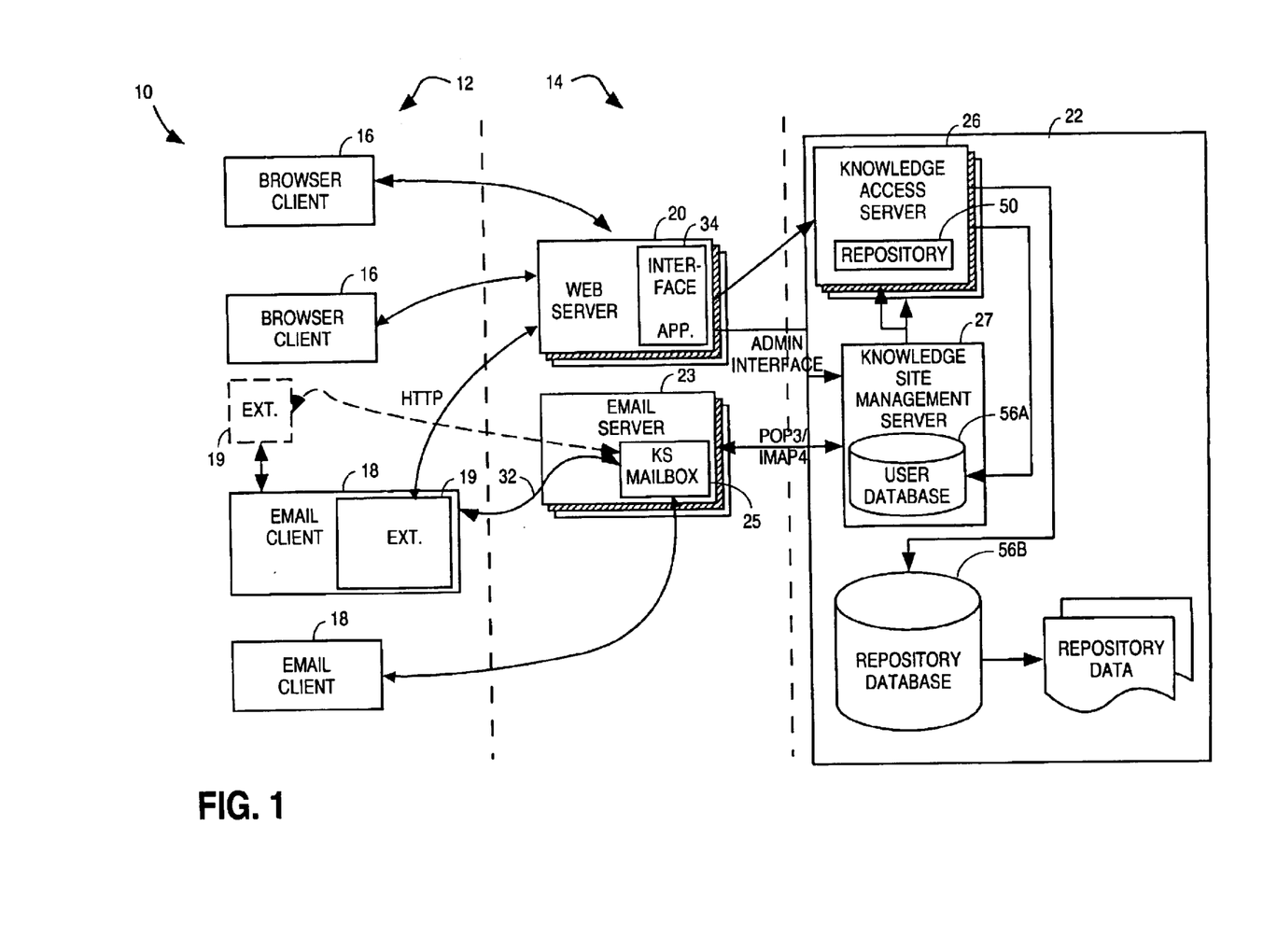
FIG. 1 is a block diagram illustrating a knowledge management system, according to an exemplary embodiment of the present invention.

FIG. 1 is a block diagram illustrating an exemplary embodiment of a knowledge management system 10 that intercepts electronic documents, extracts terms therefrom that are potentially indicative of a knowledge base of a user, and distributes a user knowledge profile constructed from the extracted "knowledge" terms. For the purposes of the present application, the word "term" and phrase "knowledge term" shall be taken to include any acronym, word, collection of words, phrase, sentence, or paragraph.

The grammatical structure, length, frequency and density with which the extracted knowledge terms occur within the electronic documents, and prior history of use of the extracted knowledge terms within an organization may furthermore be utilized to attach a metric, in the form of a confidence level value, to the relevant knowledge terms for the purpose of grouping, ranking, and prioritizing such knowledge terms. For the purposes of the present application, the term "confidence level" shall be taken to mean any indication, numeric or otherwise, of a level within a predetermined range.

Knowledge terms may furthermore be stored in either a private or public portion of the user knowledge profile, depending upon the confidence level values thereof. With a view to determining which terms are truly indicative of a knowledge base, a number of rules (or algorithms) may be exercised with respect to extracted terms to identify terms that are candidates for inclusion within a public portion of the user knowledge profile. Further rules (or algorithms) may be applied to an assembled knowledge profile for the purpose of continually organizing and refining the profile. Alternatively, the contents of a user's knowledge profile may be periodically reviewed by the user ("owner") to organize the public and private portions according to user preferences.

User control over the content of the private and public portions of the user's knowledge profile enhance the privacy of the system, protecting electronic documents from unwanted intrusion by others, including searchers. Unrestricted access to the public portion of the user knowledge profile may be provided to other users, for instance those in a particular organization. The private portion of a user knowledge profile may, on the other hand, have a restricted access and may require specific authorization by the owner for the provision of information concerning the user knowledge profile, and the owner, in response to a specific request.

The knowledge management system 10 may conveniently be viewed as comprising a client system 12 and a server system 14. Client system 12 includes clients with access to the server system 14, such as Internet browser clients 16 or e-mail clients 18, which may be resident on machines within the knowledge management system 10 or coupled to it through a computer network. Extensions 19 are incorporated into an e-mail client 18 to enable it to send electronic messages to a knowledge server 22. In particular, e-mail messages are copied to a special e-mail address 25 maintained by an e-mail server 23 that is associated with the knowledge server 22 (illustrated as arrow 32). As shown in FIG. 1, the extensions 19 may be integral with an e-mail client 18, or external to the client 18 and in communication therewith. Alternatively, the user of an e-mail client 18 may manually address an e-mail to the e-mail address 25, or e-mails from the client system 12 may be intercepted by the first server through which the e-mails pass and forwarded onto the knowledge server 22, thus eliminating the need for the extensions 19. The browser clients 16 provide an additional means to submit documents to the knowledge server 22 through an interface application 34 maintained on a web server 20.

The server system 14 of the system 10 includes the web server 20, the e-mail server 23 and the knowledge server 22, although the invention is not so limited. The components of the knowledge server 22 illustrated in FIG. 1 are collectively responsible for examining and processing electronic documents received on the server system 14 from various sources, including the e-mail server 23 and the web server 20. Servers for other text-based applications used in the organization also may be considered part of the server system 14 and are interfaced into the knowledge server 22 through gateways (not shown). It will be further appreciated that alternate means of submitting electronic documents to the knowledge server 22, such as the implementation of standard application program interfaces (APIs), are contemplated as within the scope of the invention.

The knowledge server 22 includes a knowledge site management server (KSMS) 27 and a knowledge access server (KAS) 26. The KAS 26 provides a local, logical view of a knowledge repository 50, which is physically stored in a user database 56A and a repository database 56B. Once extracted from the electronic documents, knowledge terms may be processed so as to associate them with other knowledge terms within the repository 50 and to create or update knowledge profiles. Both databases 56A, 56B may store knowledge terms, as well as other data pertaining to users, the system, passwords, etc., in codes or other encrypted form that are only meaningful when accessed through the interfaces offered by system 10 to enhance privacy. The KSMS 27 is given access to the local view of the knowledge repository 50 maintained by the KAS 26. It will be appreciated that although the user database 56A and the repository database 56B are illustrated as separate databases in FIG. 1, other physical and/or logical arrangements of the databases 56A, 56B and the corresponding knowledge repository 50 are equally applicable to the present invention.

The web server 20 facilitates access to the local view of the knowledge repository 50 by the browser clients 16 through the web server interface application 34. The web server 20 also facilitates knowledge profile queries, e-mail addressing based on knowledge profiles, and other types of access to the knowledge server 22.

Further details of the knowledge management system 10 and the creation and use of knowledge profiles are given in U.S. Pat. No. 6,115,709 entitled METHOD AND SYSTEM FOR CONSTRUCTING A KNOWLEDGE PROFILE OF A USER HAVING UNRESTRICTED AND RESTRICTED ACCESS PORTIONS ACCORDING TO LEVELS OF CONFIDENCE OF THE CONTENT OF THE PORTIONS, issued on Sep. 5, 2000 and assigned to the assignee of the present application, and which is hereby incorporated by reference.

Figure 2:
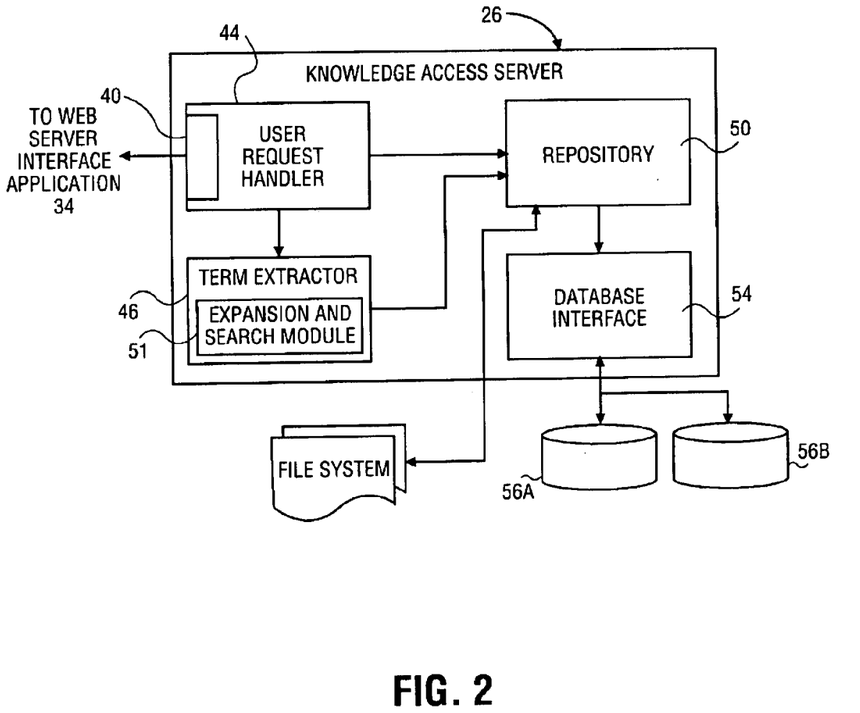
FIG. 2 is a block diagram of a knowledge access server, according to an exemplary embodiment of the present invention.

FIG. 2 is a block diagram illustrating an exemplary embodiment of the knowledge access server 26, according to the present invention. As illustrated in FIG. 2, in one embodiment, the knowledge access server 26 includes a socket front-end 40 to facilitate communication with the web server interface application 34. The knowledge access server 26 further includes request handler 44, term extractor 46, knowledge repository 50, and database interface 54 interacting with user database 56A and repository database 56B.

The knowledge access server 26 functions primarily as an interface between knowledge users and knowledge repository 50. It provides services to the web server interface application 34, which implements a number of user interfaces for interacting with knowledge repository 50.

The request handler 44 receives user requests to match knowledge terms contained in an electronic document with knowledge profiles stored in knowledge repository 50. The term extractor 46 extracts the knowledge terms from the electronic document and processes the extracted terms. The term extractor 46 further includes an expansion and search module 51 for processing the extracted terms to obtain a set of expressions and for searching the knowledge repository 50 for profiles matching the set of expressions.

Figure 3:
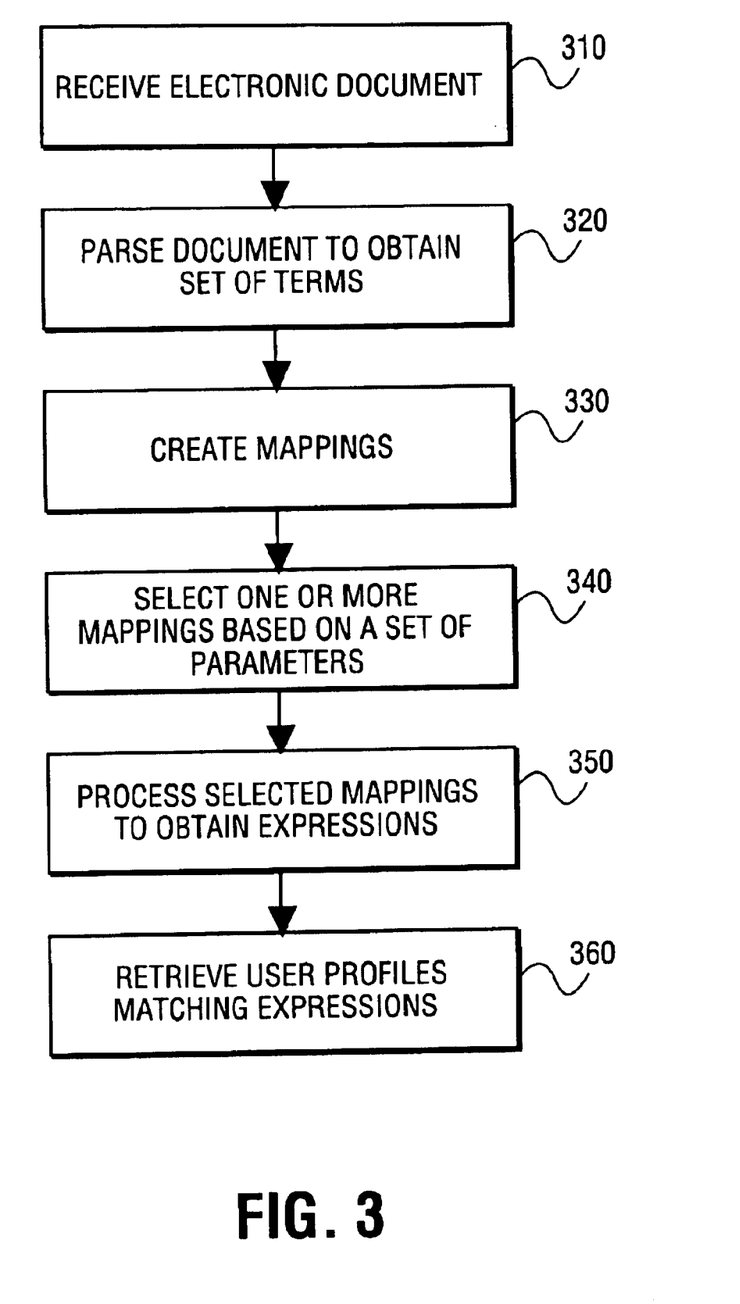
FIG. 3 is a flow diagram illustrating a method for matching terms contained in an electronic document with a set of user profiles, according to an exemplary embodiment of the present invention.

FIG. 3 is a flow diagram illustrating a method for matching terms contained in an electronic document with a set of user profiles, according to an exemplary embodiment of the present invention.

As illustrated in FIG. 3, at processing block 310, an electronic document is received. In one embodiment, request handler 44 receives the electronic document from the web server interface application 34 via the socket front-end 40. The electronic document is then forwarded to the term extractor 46.

At processing block 320, the electronic document is parsed to obtain a set of knowledge terms. In one embodiment, the term extractor 46 parses the document and extracts the knowledge terms. Each knowledge term includes multiple keywords. In one embodiment, the keywords further include main keywords, for example nouns that appear in the set of knowledge terms, and related keywords, which are keywords appearing with the main keywords in the knowledge terms.

At processing block 330, mappings of each main keyword in the set of knowledge terms to multiple related keywords are created. In one embodiment, the expansion and search module 51 creates the mappings according to a sequence of events described in further detail below.

At processing block 340, one or more mappings are selected based on a set of predetermined parameters. In one embodiment, the expansion and search module 51 selects the mappings according to a sequence of events described in further detail below.

At processing block 350, the selected mappings are processed to obtain search expressions. In one embodiment, the expansion and search module 51 performs the processing according to a sequence of events described in further detail below.

Finally, at processing block 360, user profiles matching the constructed search expressions are retrieved from repository 50. In one embodiment, the expansion and search module 51 performs the search using the search expressions and the set of knowledge terms and retrieves the user profiles that match the search criteria embodied in the expressions.

Figure 4:
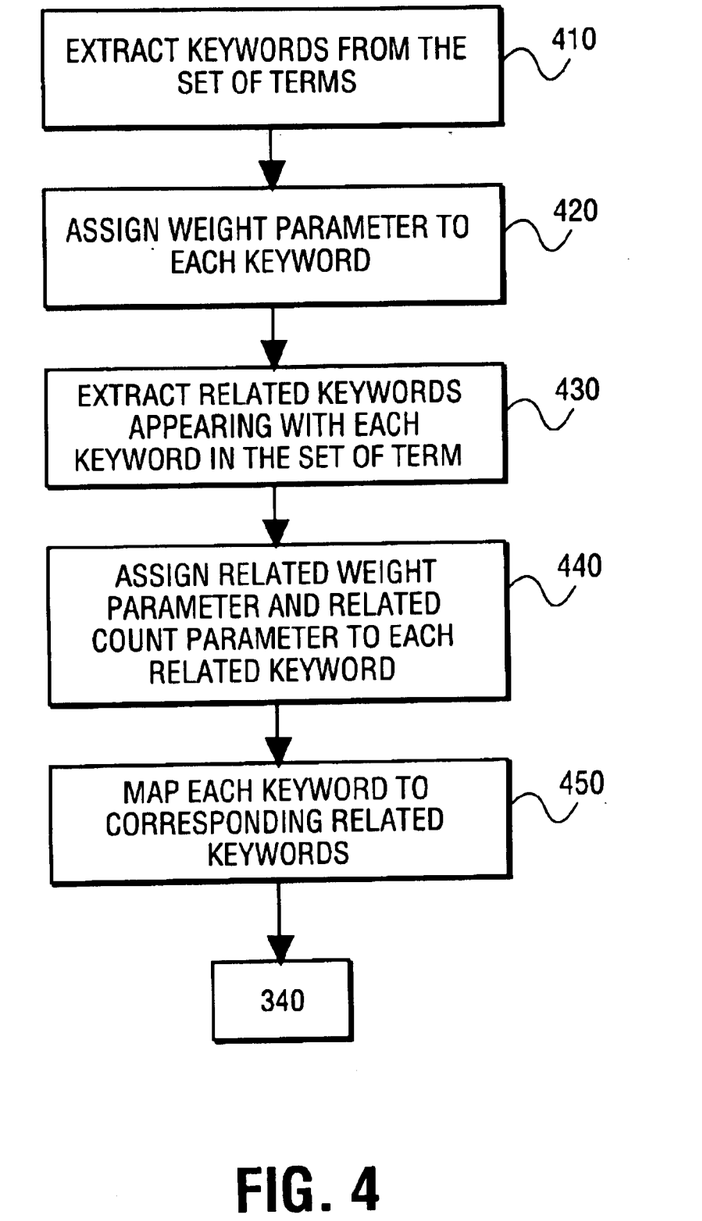
FIG. 4 is a flow diagram illustrating a method of creating mappings of each keyword contained in the terms to related keywords contained in the same terms, according to an exemplary embodiment of the present invention.

FIG. 4 is a flow diagram illustrating a method of creating mappings of each keyword contained in the terms to the related keywords contained in the same terms, according to an exemplary embodiment of the present invention. The method of creating mappings relates to processing block 330 shown in FIG. 3.

As illustrated in FIG. 4, at processing block 410, main keywords are extracted from the set of knowledge terms. In one embodiment, the main keywords include nouns that appear in the set of knowledge terms. In this embodiment, the term extractor 46 extracts the main keywords from the set of knowledge terms.

At processing block 420, a weight parameter is assigned to each extracted keyword. In one embodiment, the expansion and search module 51 within the term extractor 46 calculates and assigns each weight parameter. In one embodiment, each weight parameter is calculated as a sum of the weighted occurrences of all knowledge terms in which the corresponding keyword appears.

At processing block 430, keywords related to each extracted main keyword are also extracted from the set of knowledge terms. In one embodiment, the related keywords are keywords appearing with each main keyword in the set of knowledge terms. In this embodiment, the term extractor 46 extracts the related keywords from the set of knowledge terms.

At processing block 440, a related weight parameter is assigned to each extracted related keyword. Further, a related count parameter is assigned to each related keyword. In one embodiment, the expansion and search module 51 within the term extractor 46 calculates and assigns the related weight parameter and the related count parameter. The related weight parameter assigned to each related keyword is calculated as a sum of the weighted occurrences of all knowledge terms in which the main keyword and the particular related keyword appear together. The related count parameter is calculated as the count of knowledge terms in which the keyword and the particular related keyword appear together.

At processing block 450, each main keyword is mapped to corresponding related keywords to obtain multiple mappings. In one embodiment, the expansion and search module 51 performs the mapping procedure and obtains the mappings. In one embodiment, each mapping has the format {main Keyword, {relatedKeyword1, relatedKeyword2, . . . , relatedKeywordN}}. Finally, the method illustrated in FIG. 4 ends with block 340 described in detail in connection with FIG. 3.

Figure 5:
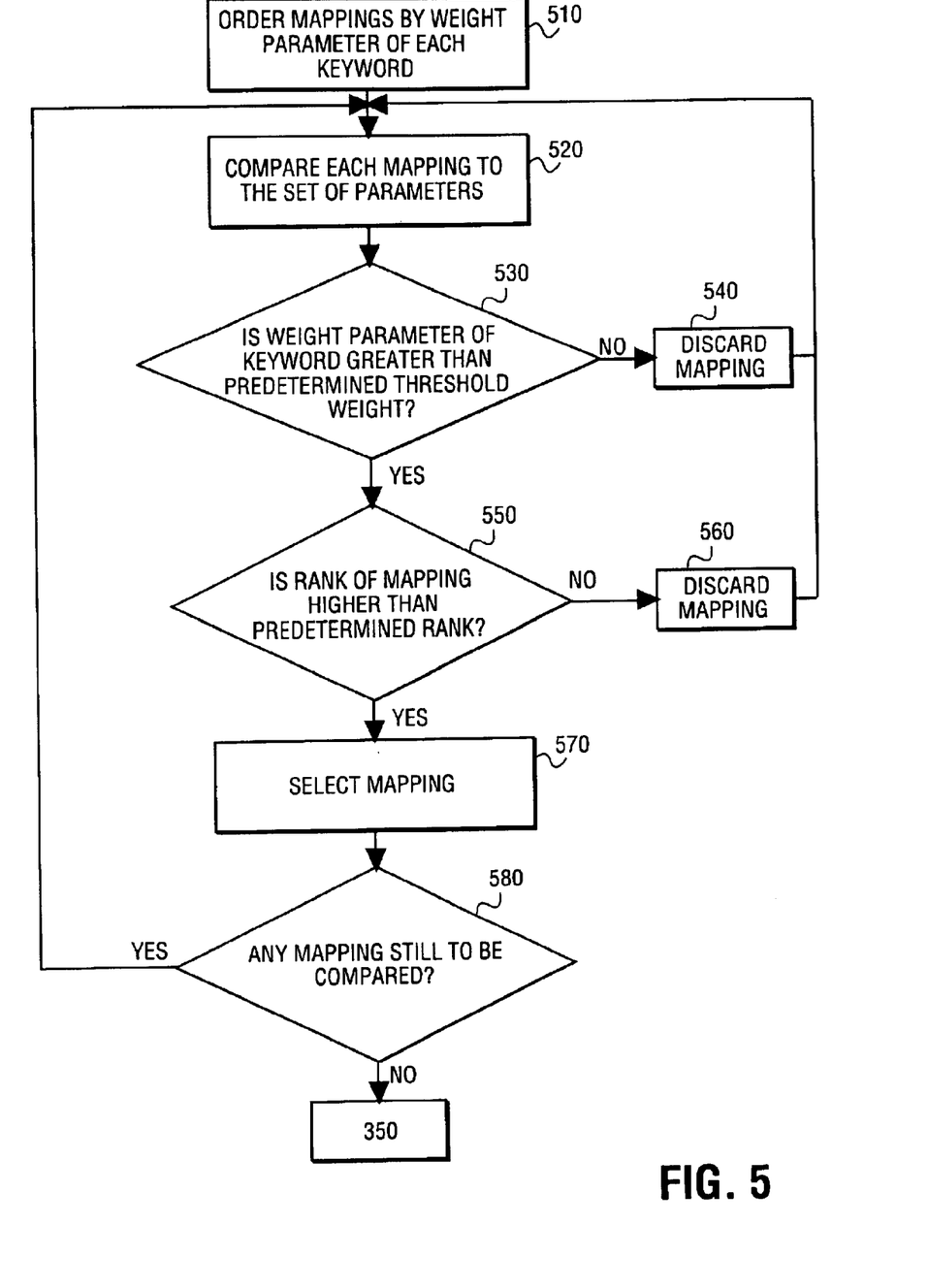
FIG. 5 is a flow diagram illustrating a method of selecting mappings based on a set of parameters, according to an exemplary embodiment of the present invention.

FIG. 5 is a flow diagram illustrating a method of selecting mappings based on a set of predetermined parameters, according to an exemplary embodiment of the present invention. The method of selecting mappings based on a set of predetermined parameters relates to processing block 340 shown in FIG. 3.

As illustrated in FIG. 5, at processing block 510, the created mappings are ordered based on the weight parameter of each main keyword into an ordered list. In one embodiment, the expansion and search module 51 performs the ordering of the mappings.

At processing block 520, each ordered mapping is compared with a set of predetermined parameters. In one embodiment, the predetermined parameters are predefined within the system and include a predetermined threshold weight parameter and a predetermined threshold rank of the mappings that need to be selected. In one embodiment, the expansion and search module 51 performs the comparison between each mapping and each predetermined parameter of the set of parameters.

At processing block 530, a decision is made whether the weight parameter of the main keyword of one mapping is greater than the predetermined threshold weight parameter. In one embodiment, the expansion and search module 51 makes the above decision. If the weight parameter is lower than the threshold weight parameter, then, at processing block 540, the mapping is discarded and blocks 520 and 530 are repeated.

Otherwise, if the weight parameter is greater than the predetermined threshold weight, at processing block 550, a decision is made whether the rank of the particular mapping is higher than a predetermined rank. In one embodiment, the expansion and search module 51 makes the above decision. If the rank of the mapping is lower than the predetermined rank, then at processing block 560, the mapping is discarded and blocks 520 through 550 are repeated.

Otherwise, if the rank of the mapping is higher than the predetermined rank, the mapping is selected at processing block 570. In one embodiment, the expansion and search module 51 selects the mapping.

At processing block 580, a decision is made whether any mapping still has to be compared to the predetermined parameters. If another mapping exists, then blocks 520 through 570 are repeated. Otherwise, the method illustrated in FIG. 5 ends with block 350 described in detail in connection with FIG. 3.

Figure 6:
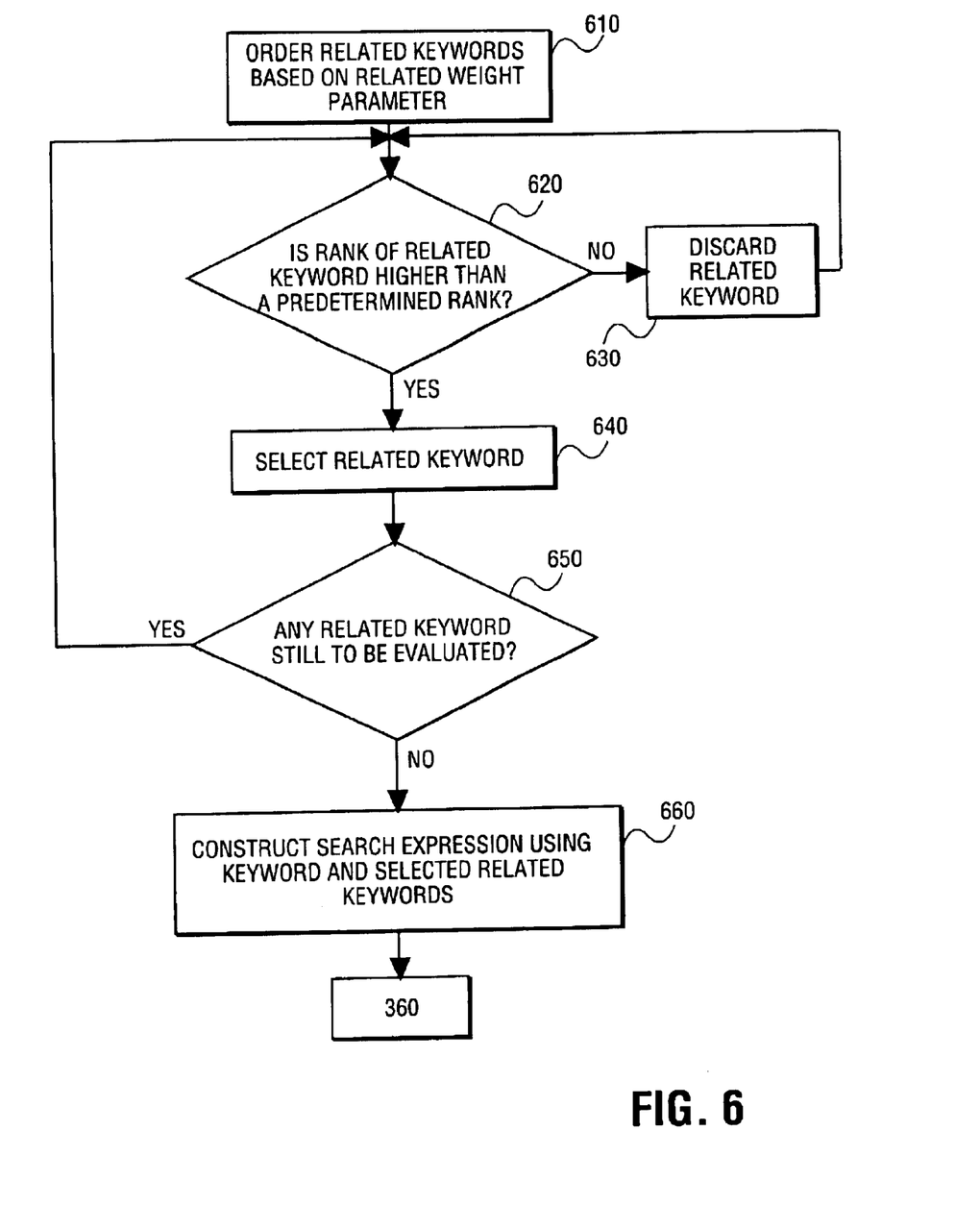
FIG. 6 is a flow diagram illustrating a method of constructing expressions from mappings, according to an exemplary embodiment of the present invention.

FIG. 6 is a flow diagram illustrating a method of constructing expressions from mappings, according to an exemplary embodiment of the present invention. The method of constructing the expressions relates to processing block 350 shown in FIG. 3.

As illustrated in FIG. 6, at processing block 610, for each selected mapping, respective related keywords are ordered based on the related weight parameter. In one embodiment, the expansion and search module 51 performs the ordering of the related keywords within each mapping.

At processing block 620, a decision is made whether a rank of one related keyword is higher than a predetermined rank defined for the system. In one embodiment, the expansion and search module 51 makes the above decision. If the rank of the related keyword is lower than the predetermined rank, then, at processing block 630, the respective related keyword is discarded and block 620 is repeated for a new related keyword. Otherwise, if the rank of the related keyword is higher than the predetermined rank, at processing block 640, the related keyword is selected. In one embodiment, the expansion and search module 51 selects the related keyword.

At processing block 650, a decision is made whether any ordered related keyword still requires evaluation. If yes, then blocks 620 through 640 are repeated. Otherwise, at processing block 660, a search expression is constructed for each mapping using the main keyword and any selected related keywords. In one embodiment, the expansion and search module 51 constructs the search expression. In one embodiment, the search expression has the format "mainKeyword AND (relatedKeyword1 OR relatedKeyword2 OR . . . OR relatedKeywordN)". The method illustrated in FIG. 6 ends with block 360, described in detail in connection with FIG. 3.

Once the search expressions are constructed, the expansion and search module 51 performs a query on the database of user profiles stored in the repository 50. Module 51 uses the set of knowledge terms and the search expressions to obtain the strength with which each user profile matches the search criteria. Each profile is selected either because of an exact match with one term of the set of knowledge terms, or because the profile matches one of the constructed search expressions.

Figure 7:
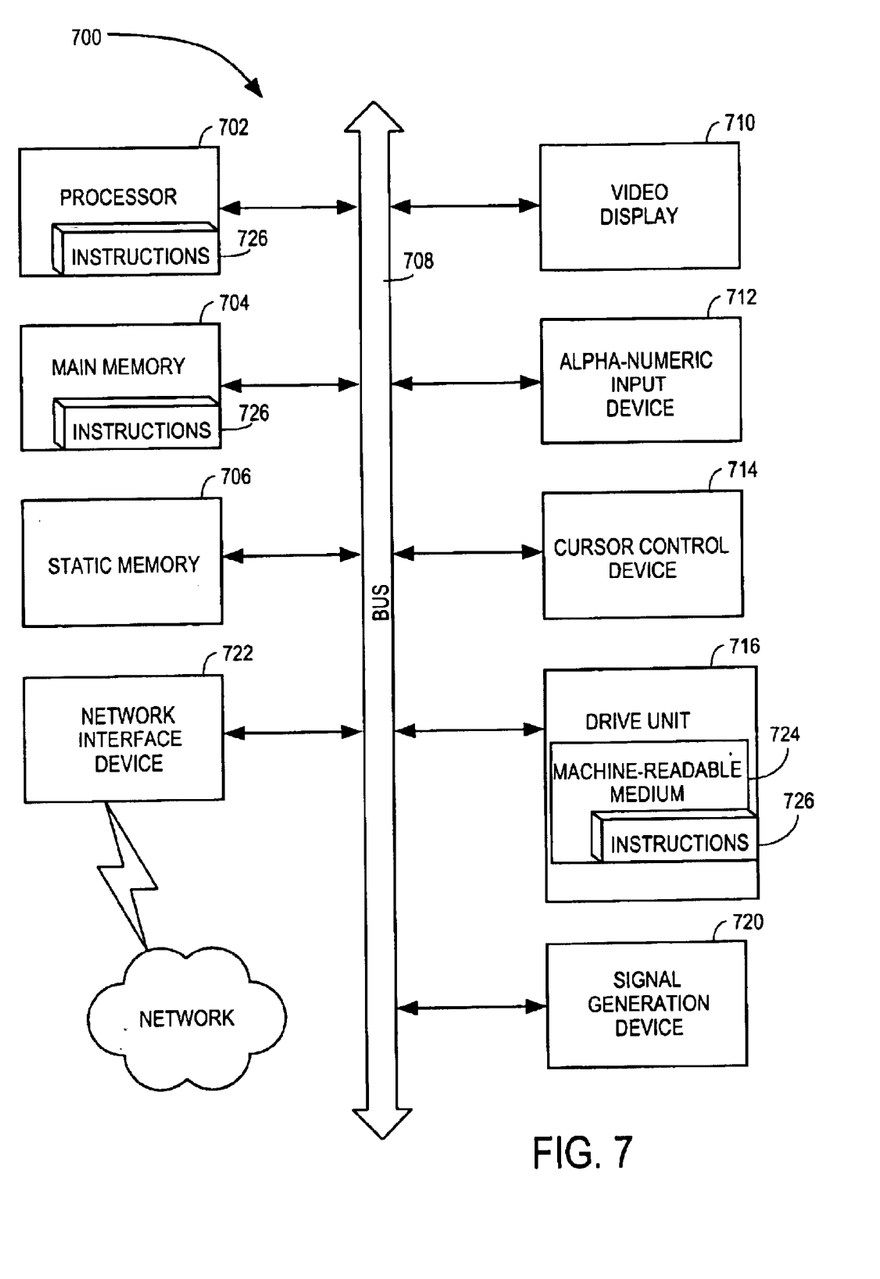
FIG. 7 is a diagram of one embodiment of a computer system suitable for performing any one of the methods discussed above.

FIG. 7 is a diagrammatic representation of machine in the form of a computer system 700 within which software, in the form of a series of machine-readable instructions, for performing any one of the methods discussed above may be executed. The computer system 700 includes a processor 702, a main memory 704 and a static memory 706, which communicate via a bus 708. The computer system 700 is further shown to include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 720 (e.g., a speaker) and a network interface device 722. The disk drive unit 716 accommodates a machine-readable medium 724 on which software 726 embodying any one of the methods described above is stored. The software 726 is shown to also reside, completely or at least partially, within the main memory 704 and/or within the processor 702. The software 726 may furthermore be transmitted or received by the network interface device 722. For the purposes of the present specification, the term "machine-readable medium" shall be taken to include any medium that is capable of storing or encoding a sequence of instructions for execution by a machine, such as the computer system 700, and that causes the machine to perform the methods of the present invention. The term "machine-readable medium" shall be taken to include, but not limited to, solid-state memories, optical and magnetic disks, and carrier wave signals.

If written in a programming language conforming to a recognized standard, the software 726 can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one from or another (e.g., program, procedure, process, application, module, logic . . . ), as taking an action or causing a result. Such expressions are merely a shorthand way of saying that execution of the software by a machine, such as the computer system 700, the machine to perform an action or a produce a result.

The preceding description of FIG. 7 is intended to provide an overview of computer hardware and other operating components suitable for implementing the invention, but is not intended to limit the applicable environments. One of skill in the art will immediately appreciate that the invention can be practiced with computer architectures and configurations other than that shown in FIG. 7, including hand-held devices, multiprocessor systems, microprocessor-based or programmable consumer electronics, network PCs, minicomputers, mainframe computers, and the like. A typical computer system will usually include at least a processor, memory, and a bus coupling the memory to the processor. The invention can also be practiced in distributed computing environments where tasks are performed by remote processing devices that are linked through a communications network.

A system and method for matching terms contained in an electronic document with a set of user profiles has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

What is claimed is:

1. A computer implemented method comprising:
    creating a plurality of mappings of each keyword of a plurality of keywords contained in a set of terms to at least one related keyword of a plurality of related keywords in said set of terms;
    selecting at least one mapping from said plurality of mappings based on a set of predetermined parameters; and
    processing said at least one mapping to obtain at least one expression.

2. The method according to claim 1, further comprising retrieving at least one profile of a plurality of profiles matching said at least one expression.

3. The method according to claim 1, further comprising:
    receiving an electronic document via an electronic communications network; and
    parsing said electronic document to identify said set of terms.

4. The method according to claim 1, wherein said creating further comprises:
    extracting said each keyword from said set of terms; and
    assigning a weight parameter to said each keyword.

5. The method according to claim 4, wherein said assigning further comprises calculating said weight parameter as a sum of weighted occurrences of at least one term of said set of terms containing said each keyword.

6. The method according to claim 4, wherein said creating further comprises:
    extracting said at least one related keyword appearing with said each keyword in said set of terms; and
    assigning a related weight parameter and a related count parameter to said at least one related keyword.

7. The method according to claim 6, wherein said assigning further comprises calculating said related weight parameter as a sum of weighted occurrences of at least one term of said set of terms containing said at least one related keyword substantially adjacent to said each keyword.

8. The method according to claim 6, wherein said assigning further comprises calculating said related count parameter as a sum of at least one term of said set of terms containing said at least one related keyword and said each keyword.

9. The method according to claim 1, wherein said selecting further comprises:
    calculating a weight parameter for said each keyword as a sum of weighted occurrences of at least one term of said set of terms containing said each keyword; and
    ordering said plurality of mappings based on said weight parameter for said each keyword.

10. The method according to claim 9, wherein said selecting further comprises selecting said at least one mapping having said weight parameter greater than a predetermined weight parameter of said set of predetermined parameters.

11. The method according to claim 9, wherein said selecting further comprises selecting at least one mapping having a rank higher than a predetermined rank parameter of said set of predetermined parameters.

12. The method according to claim 1, wherein said processing further comprises:
    ordering said at least one related keyword of said at least one mapping based on a related weight parameter calculated as a sum of the weighted occurrences of at least one term of said set of terms containing said at least one related keyword and said each keyword;
    selecting said at least one related keyword having a related rank higher than a predetermined related rank; and
    constructing said at least one expression using said each keyword and said at least one related keyword of said at least one mapping.

13. The method according to claim 3, wherein said electronic document comprises an electronic mail message.

14. The method according to claim 3, wherein said electronic document comprises an attachment to an electronic mail message.

15. The method according to claim 1, wherein said at least one expression is a boolean search expression.

16. A computer implemented system comprising:
    a repository module for storing a plurality of profiles; and
    an expansion module coupled to said memory module for creating a plurality of mappings of each keyword of a plurality of keywords contained in a set of terms to at least one related keyword of a plurality of related keywords in said set of terms, selecting at least one mapping from said plurality of mappings based on a set of predetermined parameters, and processing said at least one mapping to obtain at least one expression.

17. The system according to claim 16, wherein said expansion module further retrieves at least one profile of a plurality of profiles matching said at least one expression.

18. The system according to claim 16, wherein said expansion module further receives an electronic document via an electronic communications network and parses said electronic document to identify said set of terms.

19. The system according to claim 16, wherein said expansion module further extracts said each keyword from said set of terms and assigns a weight parameter to said each keyword.

20. The system according to claim 19, wherein said expansion module further calculates said weight parameter as a sum of weighted occurrences of at least one term of said set of terms containing said each keyword.

21. The system according to claim 19, wherein said expansion module further extracts said at least one related keyword appearing with said each keyword in said set of terms and assigns a related weight parameter and a related count parameter to said at least one related keyword.

22. The system according to claim 21, wherein said expansion module further calculates said related weight parameter as a sum of weighted occurrences of at least one term of said set of terms containing said at least one related keyword substantially adjacent to said each keyword.

23. The system according to claim 21, wherein said expansion module further calculates said related count parameter as a sum of at least one term of said set of terms containing said at least one related keyword and said each keyword.

24. The system according to claim 16, wherein said expansion module further calculates a weight parameter for said each keyword as a sum of weighted occurrences of at least one term of said set of terms containing said each keyword and orders said plurality of mappings based on said weight parameter for said each keyword.

25. The system according to claim 24, wherein said expansion module further selects said at least one mapping having said weight parameter greater than a predetermined weight parameter of said set of predetermined parameters.

26. The system according to claim 24, wherein said expansion module further selects at least one mapping having a rank higher than a predetermined rank parameter of said set of predetermined parameters.

27. The system according to claim 16, wherein said expansion module further orders said at least one related keyword of said at least one mapping based on a related weight parameter calculated as a sum of the weighted occurrences of at least one term of said set of terms containing said at least one related keyword and said each keyword, selects said at least one related keyword having a related rank higher than a predetermined related rank, and constructs said at least one expression using said each keyword and said at least one related keyword of said at least one mapping.

28. The system according to claim 18, wherein said electronic document comprises an electronic mail message.

29. The system according to claim 18, wherein said electronic document comprises an attachment to an electronic mail message.

30. The system according to claim 16, wherein said at least one expression is a boolean search expression.

31. A computer readable medium containing executable instructions, which, when executed in a processing system, cause said system to perform a method comprising:
creating a plurality of mappings of each keyword of a plurality of keywords contained in a set of terms to at least one related keyword of a plurality of related keywords in said set of terms;
selecting at least one mapping from said plurality of mappings based on a set of predetermined parameters; and
processing said at least one mapping to obtain at least one expression.

32. The computer readable medium according to claim 31, wherein the method further comprises retrieving at least one profile of a plurality of profiles matching said at least one expression.

33. The computer readable medium according to claim 31, wherein the method further comprises receiving an electronic document via an electronic communications network and parsing said electronic document to identify said set of terms.

34. The computer readable medium according to claim 31, wherein said creating further comprises:
extracting said each keyword from said set of terms; and
assigning a weight parameter to said each keyword.

35. The computer readable medium according to claim 34, wherein said assigning further comprises calculating said weight parameter as a sum of weighted occurrences of at least one term of said set of terms containing said each keyword.

36. The computer readable medium according to claim 34, wherein said creating further comprises:
extracting said at least one related keyword appearing with said each keyword in said set of terms; and
assigning a related weight parameter and a related count parameter to said at least one related keyword.

37. The computer readable medium according to claim 36, wherein said assigning further comprises calculating said related weight parameter as a sum of weighted occurrences of at least one term of said set of terms containing said at least one related keyword substantially adjacent to said each keyword.

38. The computer readable medium according to claim 36, wherein said assigning further comprises calculating said related count parameter as a sum of at least one term of said set of terms containing said at least one related keyword and said each keyword.

39. The computer readable medium according to claim 31, wherein said selecting further comprises:
calculating a weight parameter for said each keyword as a sum of weighted occurrences of at least one term of said set of terms containing said each keyword; and
ordering said plurality of mappings based on said weight parameter for said each keyword.

40. The computer readable medium according to claim 39, wherein said selecting further comprises selecting said at least one mapping having said weight parameter greater than a predetermined weight parameter of said set of predetermined parameters.

41. The computer readable medium according to claim 39, wherein said selecting further comprises selecting at least one mapping having a rank higher than a predetermined rank parameter of said set of predetermined parameters.

42. The computer readable medium according to claim 31, wherein said processing further comprises:
ordering said at least one related keyword of said at least one mapping based on a related weight parameter calculated as a sum of the weighted occurrences of at least one term of said set of terms containing said at least one related keyword and said each keyword;
selecting said at least one related keyword having a related rank higher than a predetermined related rank; and
constructing said at least one expression using said each keyword and said at least one related keyword of said at least one mapping.

43. The computer readable medium according to claim 33, wherein said electronic document comprises an electronic mail message.

44. The computer readable medium according to claim 33, wherein said electronic document comprises an attachment to an electronic mail message.

45. The computer readable medium according to claim 31, wherein said at least one expression is a boolean search expression.

* * * * *